US006425374B1

(12) United States Patent
Schmitz et al.

(10) Patent No.: US 6,425,374 B1
(45) Date of Patent: Jul. 30, 2002

(54) METHOD FOR AUTOMATICALLY GENERATING SMOOTHED CHARACTERISTIC DIAGRAMS FOR AN ELECTRONIC ENGINE CONTROL OF AN INTERNAL COMBUSTION PISTON ENGINE

(75) Inventors: Günter Schmitz; Werner Hansen, both of Aachen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/674,926

(22) PCT Filed: Feb. 25, 2000

(86) PCT No.: PCT/EP00/01545

§ 371 (c)(1),
(2), (4) Date: Jan. 30, 2001

(87) PCT Pub. No.: WO00/53911

PCT Pub. Date: Sep. 14, 2000

(30) Foreign Application Priority Data

Mar. 8, 1999 (DE) ........................................ 199 10 035

(51) Int. Cl.[7] ............................................ G01M 15/00
(52) U.S. Cl. ...................... 123/436; 73/117.3; 701/111
(58) Field of Search ......................... 123/436; 701/111; 73/117.3

(56) References Cited

U.S. PATENT DOCUMENTS 5,558,064 A 9/1996 Buslepp
6,253,546 B1 * 7/2001 Sun et al. .................. 701/109
6,266,610 B1 * 7/2001 Schultz et al. ............. 701/201
6,304,812 B1 * 10/2001 Kolmanovsky et al. ..... 701/103

FOREIGN PATENT DOCUMENTS

| | | |
|---|---|---|
| EP | 0 152 604 | 8/1985 |
| EP | 0 352 782 | 1/1990 |
| WO | 95/33132 | 12/1995 |

* cited by examiner

*Primary Examiner*—Erick Solis
(74) *Attorney, Agent, or Firm*—Venable; Gabor J. Kelemen

(57) ABSTRACT

The invention relates to a method for automatically generating smoothed characteristic diagrams for electronic engine controls of internal combustion piston engines. The invention is characterized in that the adjustment variable combination of the individual successive operating points are input by means of a motor control to a reference internal combustion piston engine by entering specified values of the boundary conditions for the operation of an internal combustion piston engine. According to the invention, the reference internal combustion piston engine is operated in this operating point, and the actual values and/or boundary conditions occurring during the same are acquired and compared with the specified values of the boundary conditions in an optimization system assigned to the engine control and, in the instance of variations, the adjustment variable combinations are optimally altered in a progressive manner by the optimization system. A quality function for the respective alteration of the adjustment variable combination is predetermined in the optimization system, and the quality function is corrected while taking into account already established values of the adjustment variable combination of at least one adjacent operating point.

4 Claims, 9 Drawing Sheets

Figure 1:
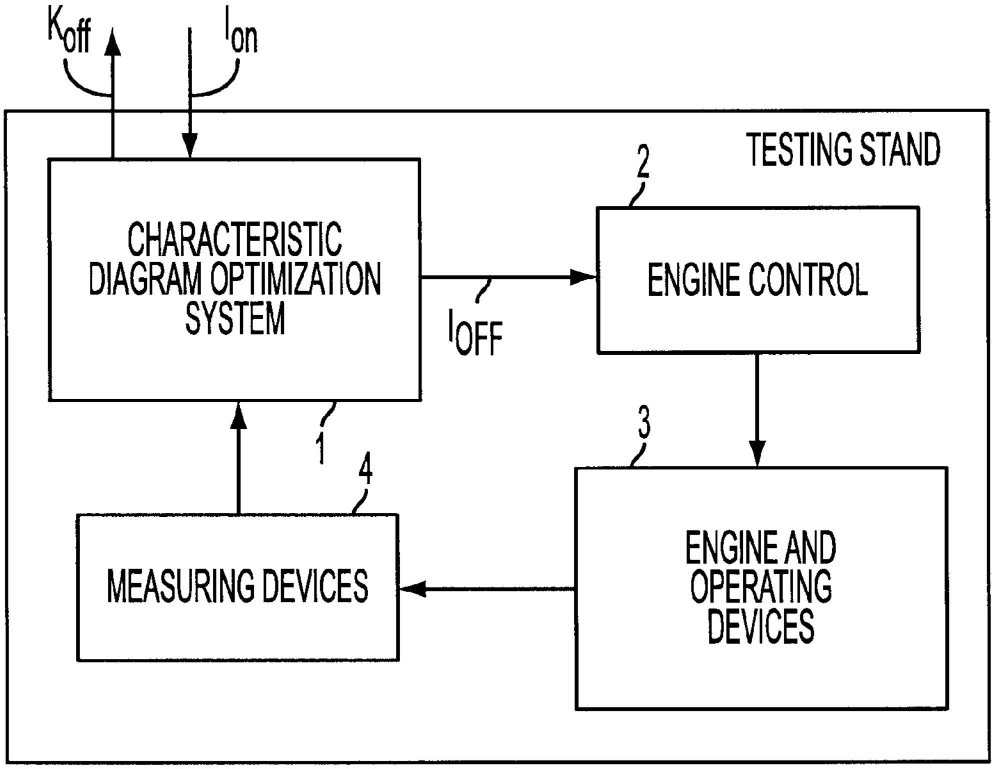

METHOD FOR AUTOMATICALLY GENERATING SMOOTHED CHARACTERISTIC DIAGRAMS FOR AN ELECTRONIC ENGINE CONTROL OF AN INTERNAL COMBUSTION PISTON ENGINE

DESCRIPTION

The invention relates to a method for automatically generating smoothed characteristic diagrams for an electronic engine control of a piston-type internal combustion engine.

Modern industrial society views mobility for the transport of goods and the drive to work as playing an important role. A great deal of this movement occurs in the streets, wherein the piston-type internal combustion engine as the driving source plays a dominating role.

Public discussion in recent years has focused on the emissions of piston-type internal combustion engines. The laws reflect this in the form of increasingly lower limit values for emissions. Furthermore, prices for the required types of fuel are on the rise. Together these two factors make it necessary to have piston-type internal combustion engines with lower emissions and less consumption.

To reach this goal, piston-type internal combustion engines must consequently be developed and constructed in accordance with the latest findings. Not only does modern mechanical design play a role in this, but the electronic components are also becoming more and more important because of the enormous increase in options and flexibility.

These days an electronic control device is used in place of the formerly used variable speed governor to adjust the ignition point to the requirements. This control device can consider influencing variables with more precision and can be adapted easier to various applications.

With these control devices, the dependencies between the input variables, for example the speed, and the output variables, meaning the adjustment variables such as advance angle, injected fuel amount etc., are deposited in characteristic diagrams that contain characteristic diagram points for each operating state of a piston-type internal combustion engine. These points predetermine the actual values for the adjustment variables.

During the development of a piston-type internal combustion engine, the necessary characteristic diagrams must be filled with values. Until now, the characteristic diagrams were created by experienced developers on the basis of testing stand measurements, experimental methods and in part also intuition based on measurements from a reference engine. This process required a considerable amount of developmental time and generally did not yield optimum results.

The expenditure for adapting the characteristic diagrams strongly depends on the number of parameters to be calibrated. In the process, the degrees of freedom in control devices increases, for example by introducing the exhaust gas re-circulation (EGR), the camshaft adjustment, a variable intake system, just to mention a few. It is nearly impossible for humans to keep a clear overview of the consequently required solution of a more than three-dimensional optimization task with many parameters.

For that reason, systems for the automatic optimization of characteristic diagrams and the related software were developed, which generated characteristic diagrams based on testing stand measurements and algorithms with a mathematical foundation. Fewer road tests with vehicles are thus needed and an optimization of the piston-type internal combustion engine is possible, even if the complete vehicle is not yet available. On the one hand, this shortens the developmental time and therefore also the “time-to-market” and consequently saves costs. On the other hand, the generated results are reproducible and do not depend on being optimized by a human being using intuition. The optimization system is furthermore easier to adapt and to adjust to other predetermined data.

Owing to the relatively short time requirement, the automatic optimization with different configurations can be carried out several times. Thus, it is possible to realize several scenarios that could not be realized with reasonable expenditure during a practical experiment.

With the methods used so far, it is possible to create characteristic “mother” diagrams for a given piston-type internal combustion engine design, based on which the corresponding characteristic diagram data carriers can be set up for the later series production and also for the series production of the engine control. However, the disadvantage of the method used so far is that when carrying out the automatic optimization, a value is generated for each support location or each operating point of a characteristic diagram, without taking into account the interrelations between neighboring support locations. This results in jumps in the calibration data for neighboring support locations, which endanger the transferability of the optimization result as well as the drivability during the practical vehicle deployment. Strong jumps in the calibration data of neighboring support locations must therefore be avoided.

In the process, jumps occur during two phases of the optimization. On the one hand, the problem is that the results of making adjustments within a characteristic diagram area that is optimized according to the same criteria show such adjustment variable jumps. On the other hand, there is the problem that jump-type transitions occur when joining characteristic diagram areas that are optimized according to different criteria.

Thus, it is the object of the invention to find a method that avoids strong jumps in the calibration data during the optimization run, but nevertheless permits a good optimization result and makes it possible to generate a smoothed characteristic diagram.

This object is solved with the method steps provided in claim 1. Modifications of the method according to the invention are specified in claims 2 to 4.

The invention is explained further in the following with the aid of schematic drawings. Shown are in:

FIG. 1 A block diagram for a testing stand with characteristic diagram optimization.

Figure 2:
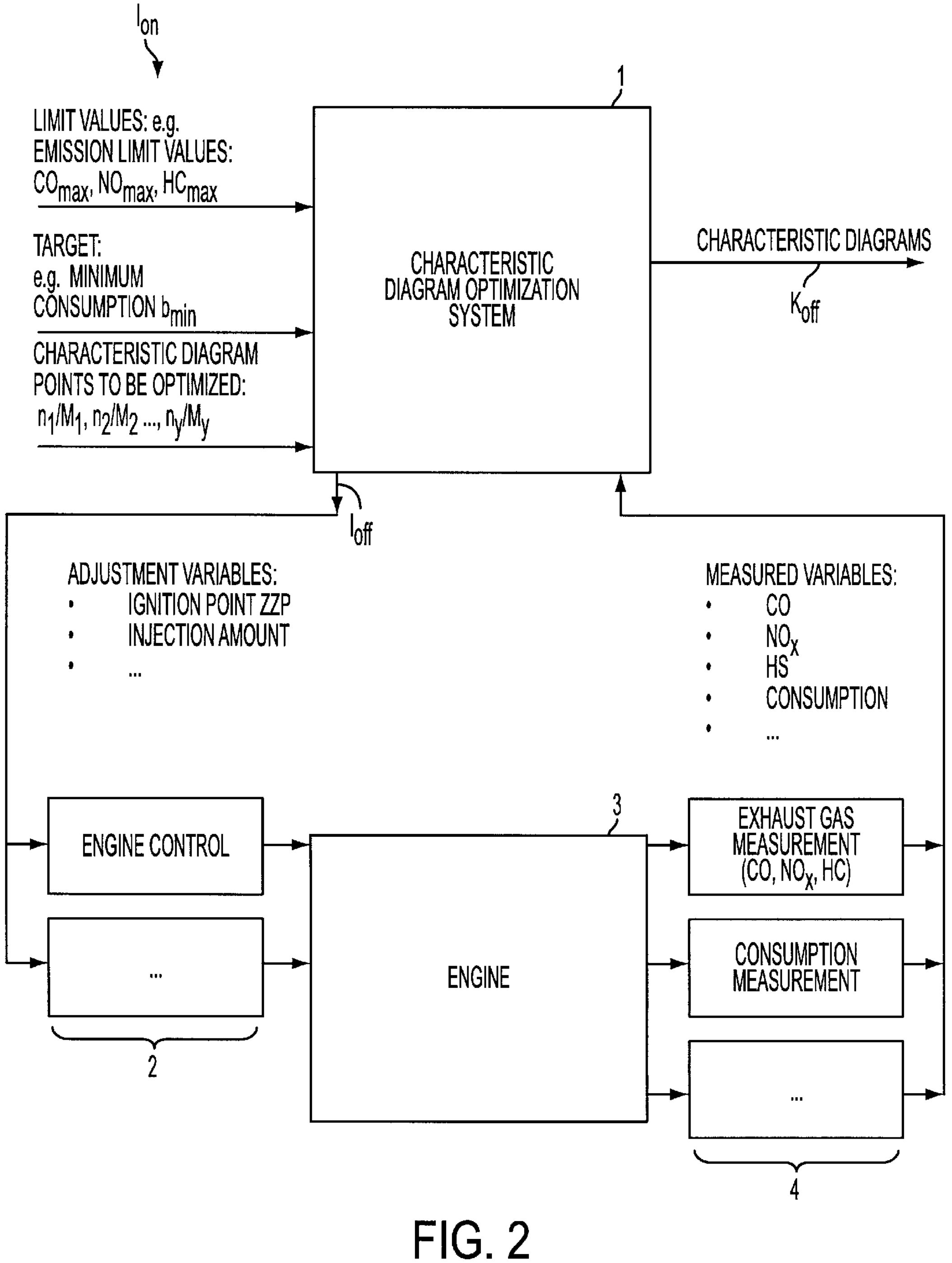

FIG. 2 The operating sequence for the testing stand according to FIG. 1, shown as a block diagram.

Figure 3:
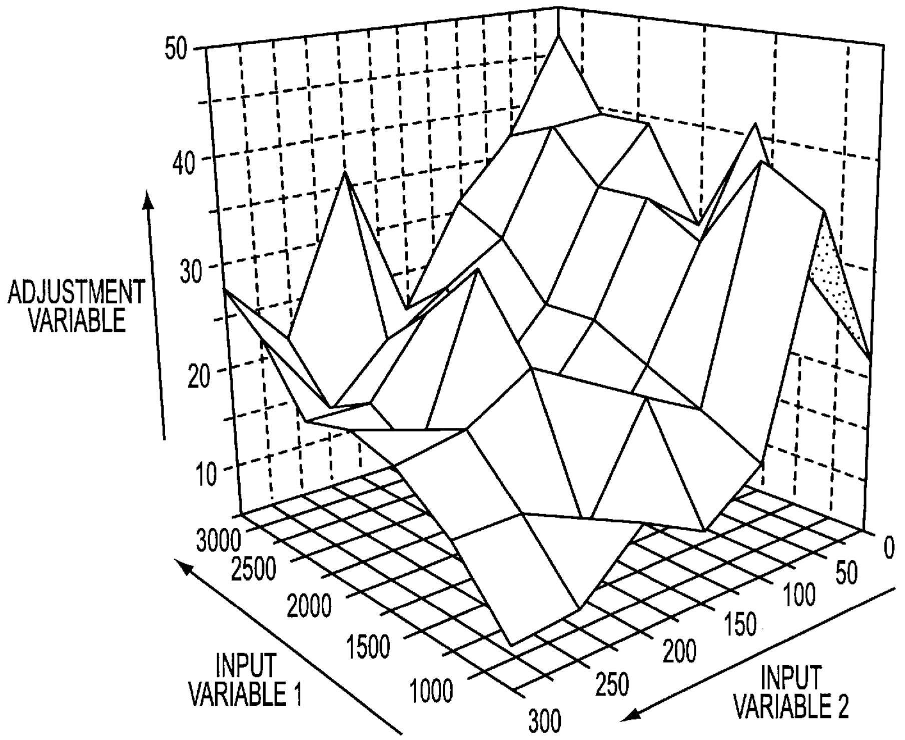
FIG. 3 (PRIOR ART)

FIG. 3 A non-smoothed characteristic diagram, generated with the method according to prior art.

Figure 4:
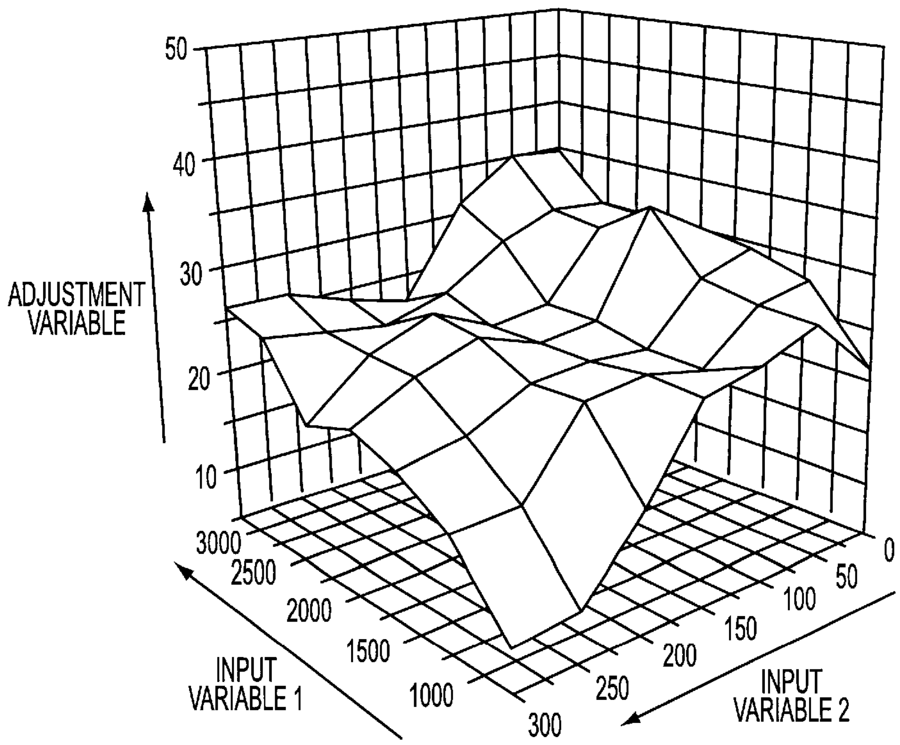

FIG. 4 A smoothed characteristic diagram, generated with the method according to the invention.

Figure 5:
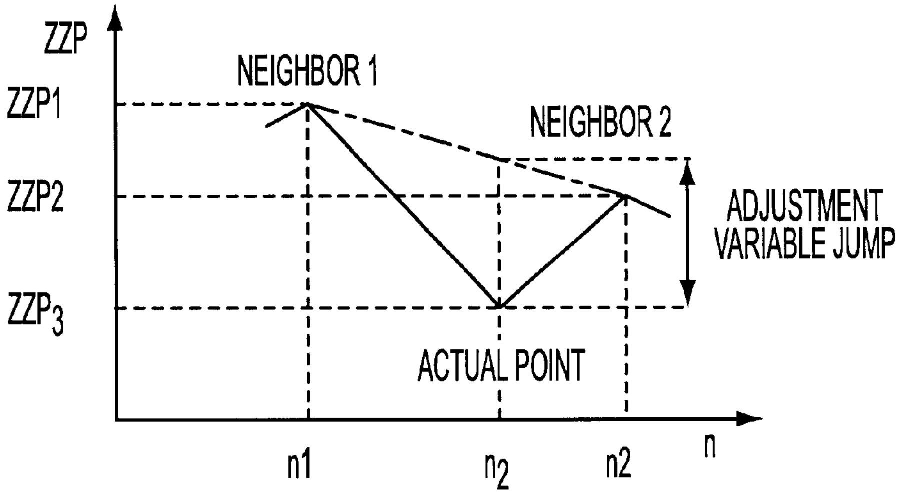

FIG. 5 The representation of an adjustment variable jump for a changeable adjustment variable.

Figure 6:
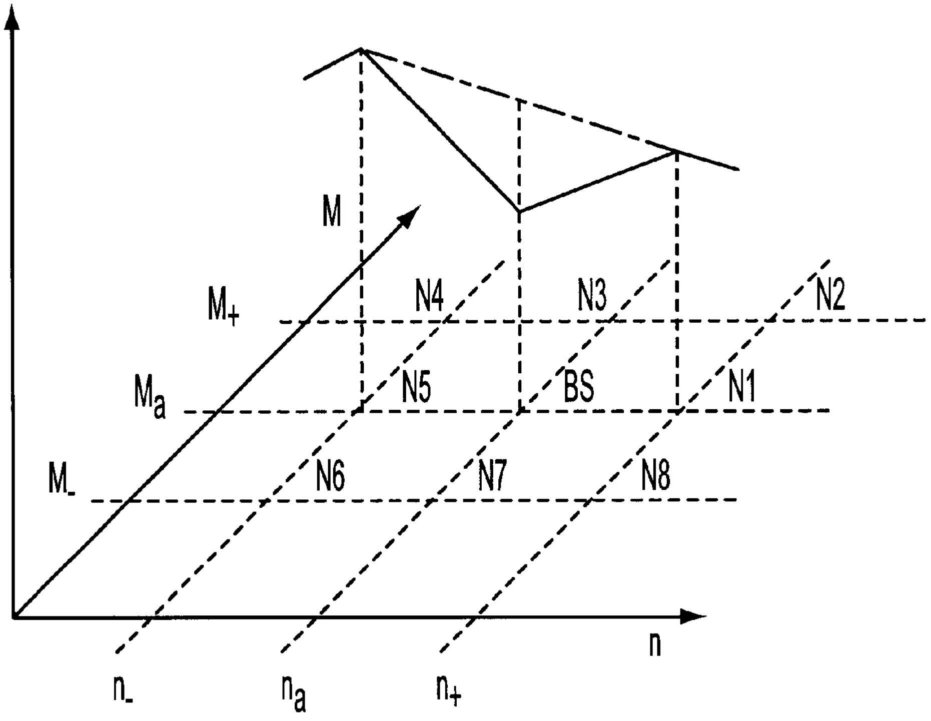

FIG. 6 The representation of the adjustment variable jump according to FIG. 5, in a coordinate system for two variables.

Figure 7:
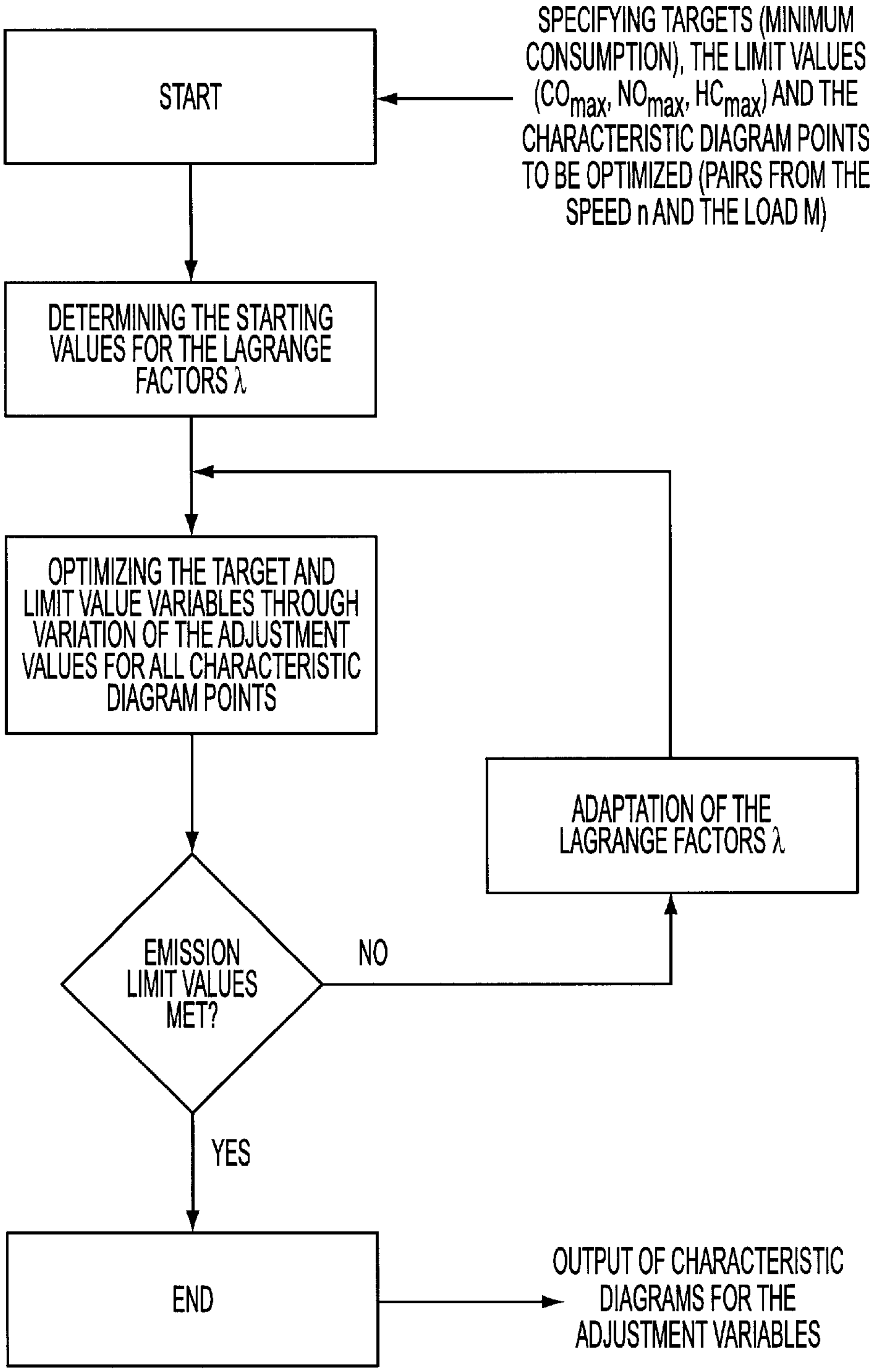

FIG. 7 A flow chart for a characteristic diagram optimization by means of a predetermined quality function.

Figure 8:
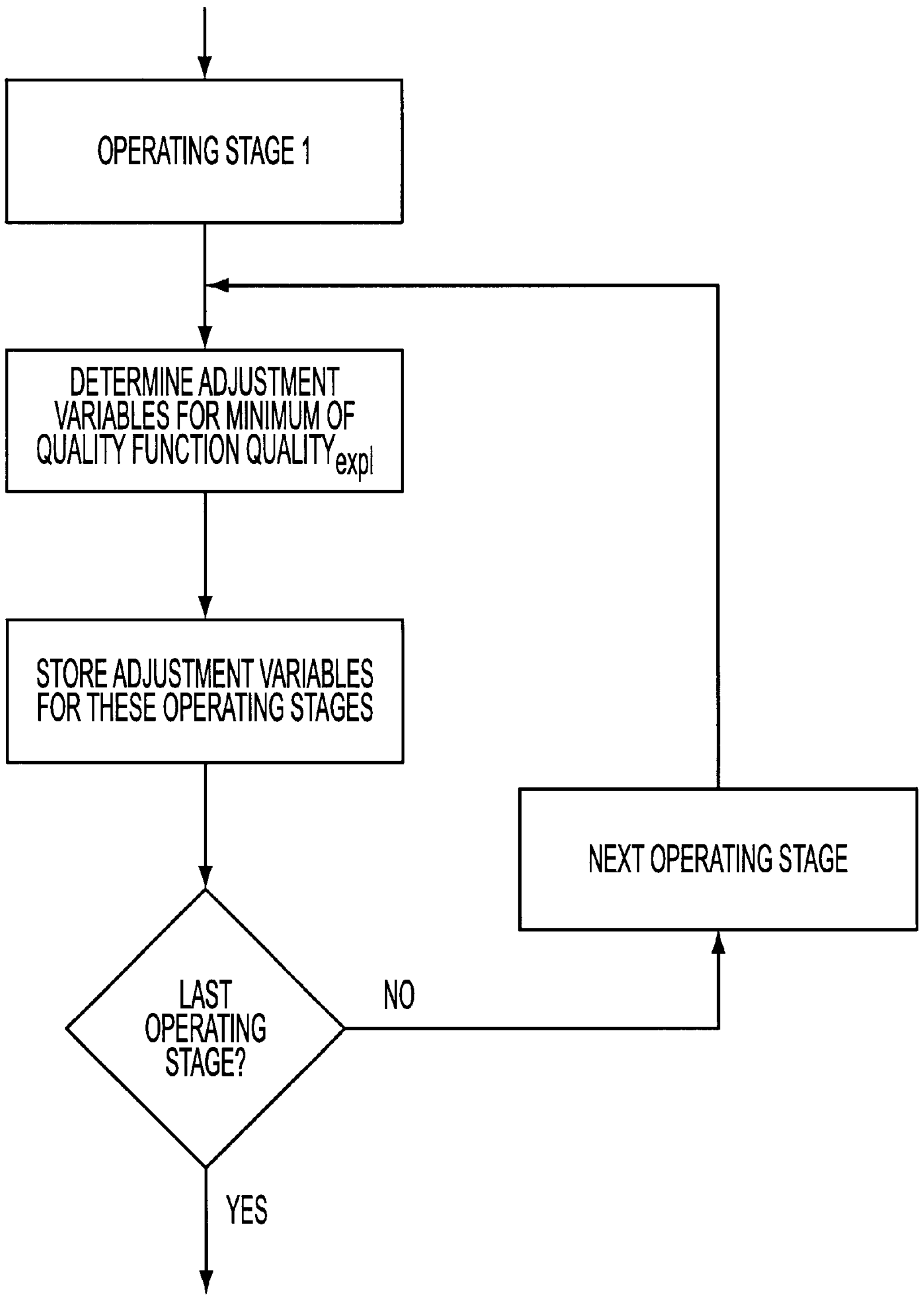

FIG. 8 A detailed flow chart for explaining the optimization of the target variables and the limit value variables.

Figure 9:
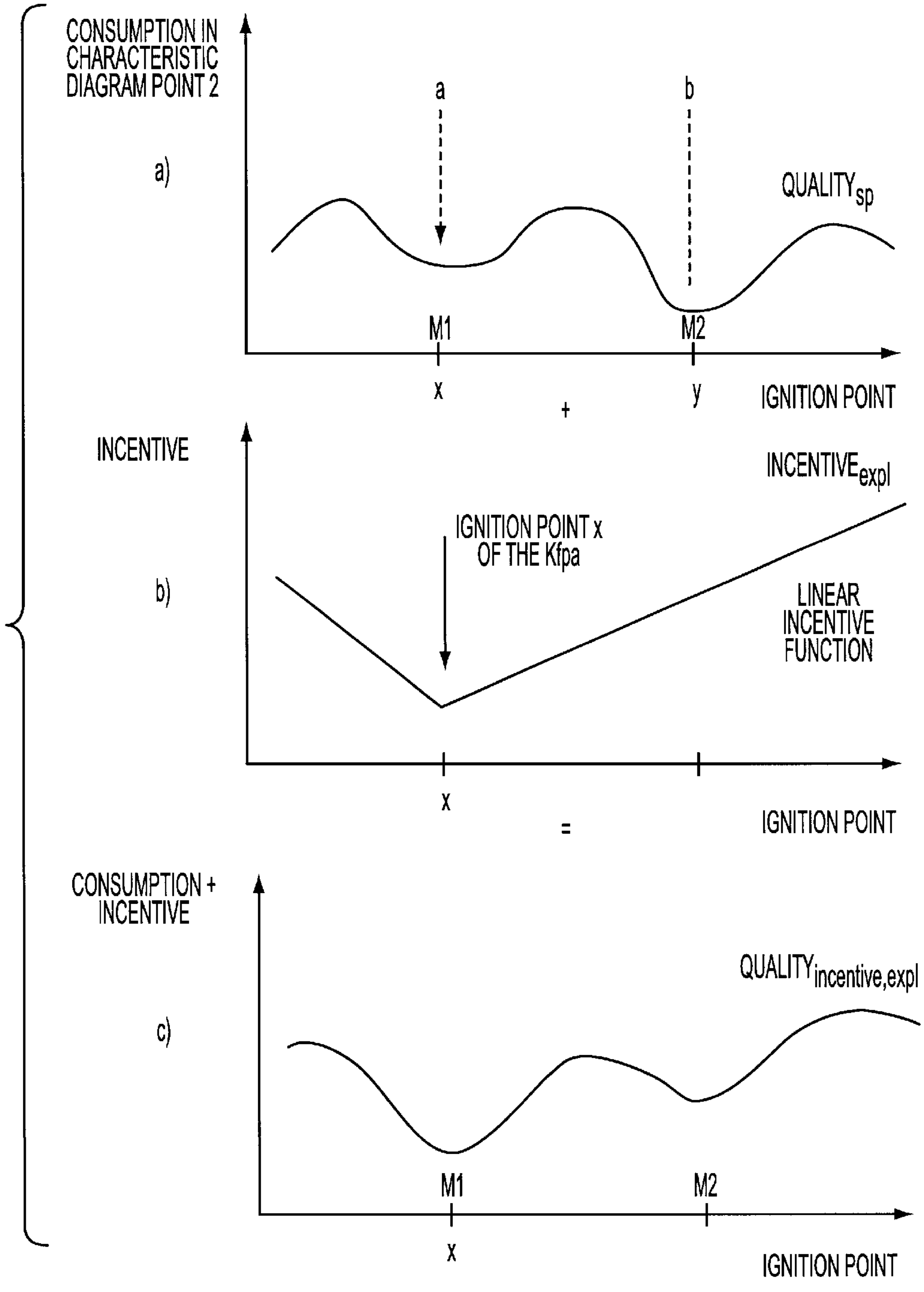

FIG. 9 The effect of superimposing an incentive function on a quality function.

Figure 10:
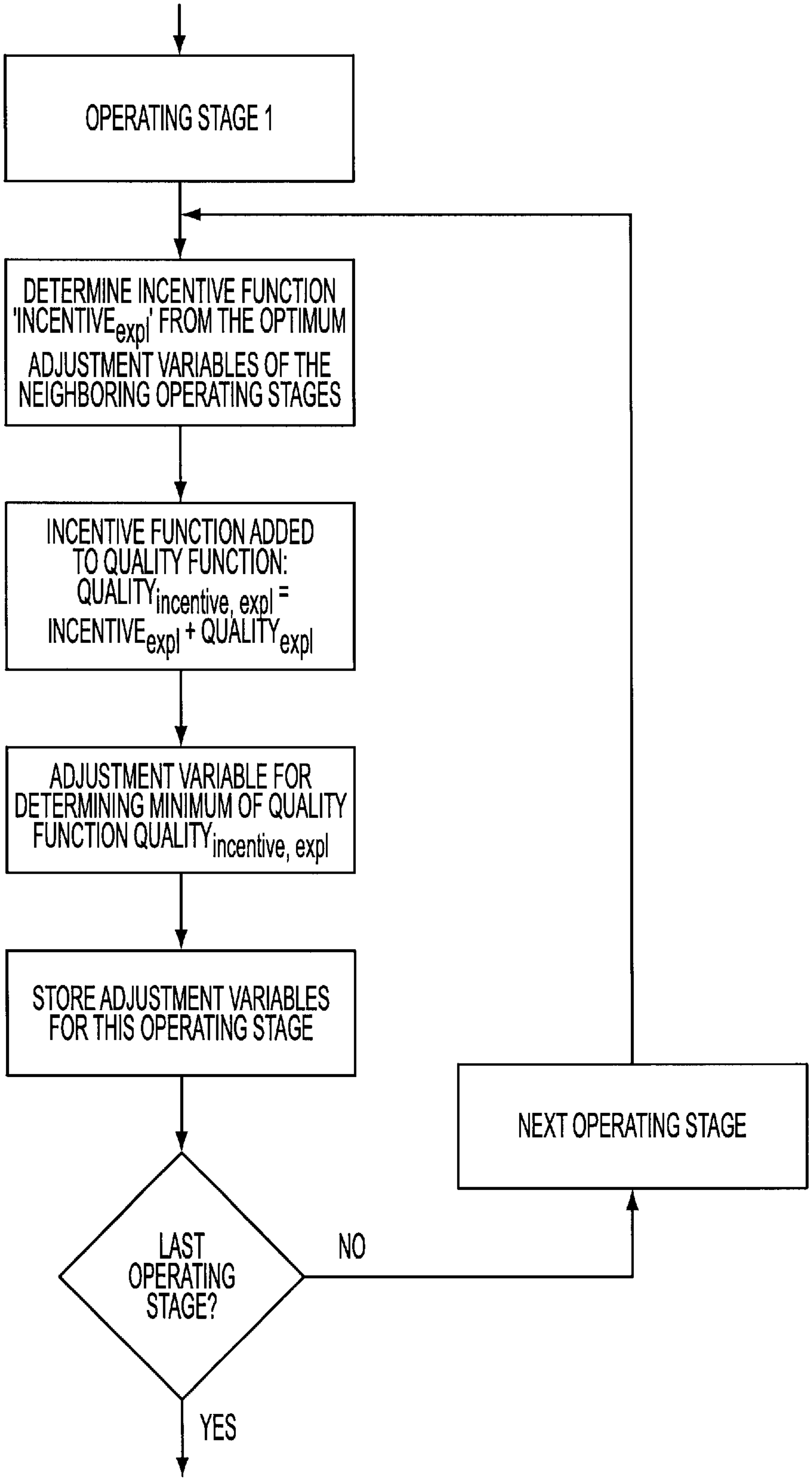

FIG. 10 A detailed flow chart for a characteristic diagram optimization when superimposing an incentive function on a quality function.

Figure 11:
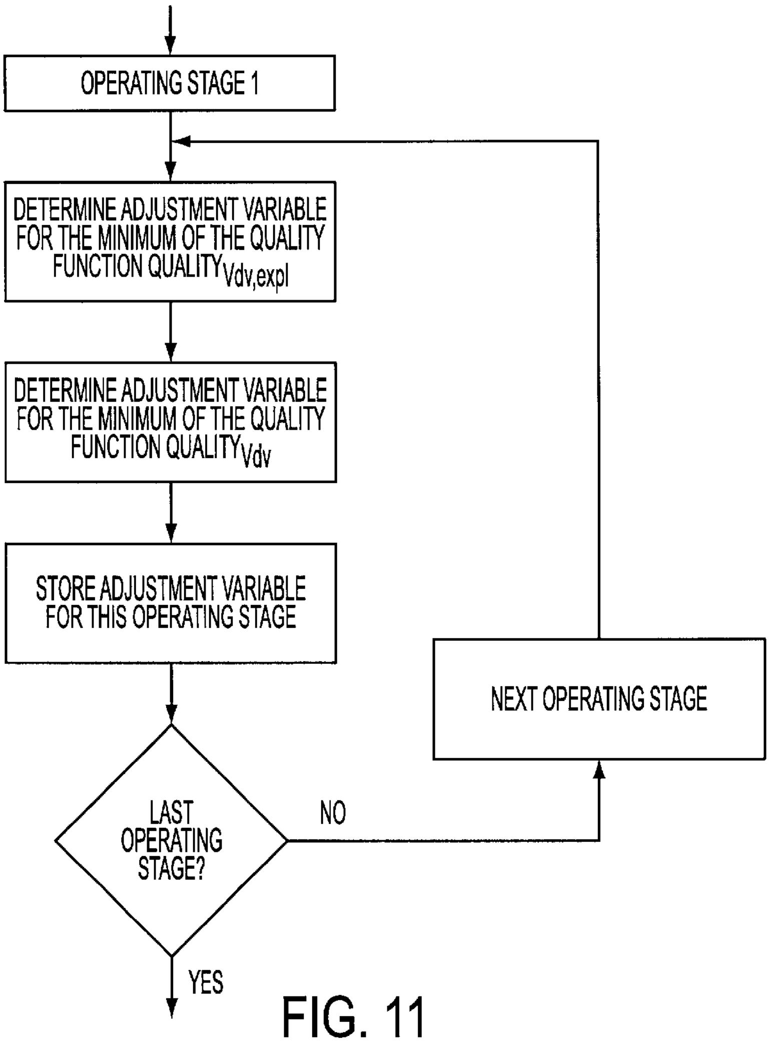

FIG. 11 A detailed flow chart for a characteristic diagram optimization by means of a quality function and detection of the adjustment variable difference.

Figure 12:
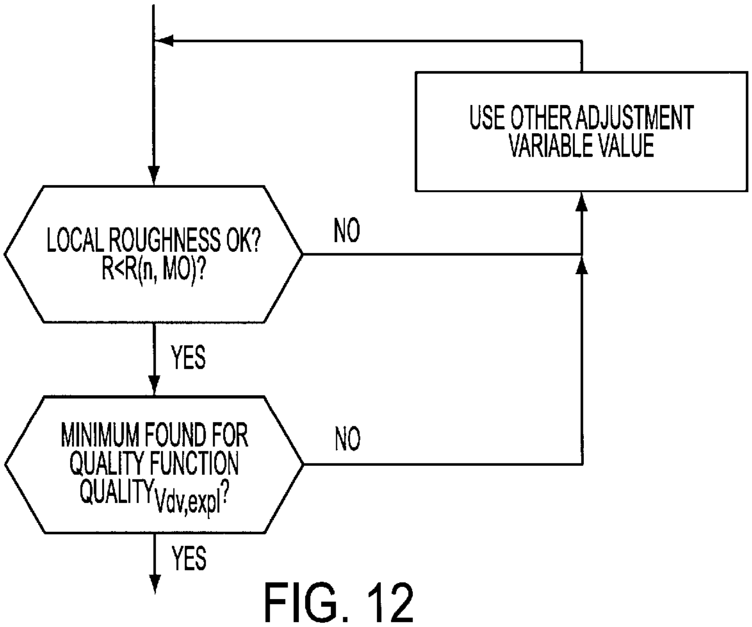

FIG. 12 A detailed flow chart for a characteristic diagram optimization for limiting the roughness in each operating stage.

FIG. 1 shows a testing stand with automatically operating characteristic diagram optimization system 1, with input data $I_{in}$ and output data $I_{out}$, as well as a characteristic diagram output $K_{out}$, an electric engine control device 2, a reference piston-type internal combustion engine 3 for a series and the required measuring devices 4. The input data for the system are in part predetermined by the user (limit values, targets and characteristic diagram points to be optimized) and in part requested by the system from the engine testing stand during the optimization (measured values). The system provides adjustment values for this, which are automatically adjusted on the piston-type internal combustion engine 3. Subsequently, the system evaluates the measured values for determining optimum adjustment values. Finally, the system generates characteristic diagrams, which are then transferred to the engine control unit 2 of the piston-type internal combustion engine 3, for which the optimization was carried out. In addition, the engine control unit 2 takes into account all values relevant when using a piston-type internal combustion engine 3 in a specified vehicle.

The operational sequence of the testing stand shown in FIG. 1 is illustrated in FIG. 2 with exemplary input data and examples for adjustment variables, for which respectively one characteristic diagram must be generated. Furthermore shown is which measuring values can be recorded in the process. The individual components of the testing stand are here identified with the reference numbers from FIG. 1. It is indicated for the engine control unit 2 of the testing stand as well as for the measuring device 4 that additional control elements and measuring devices can be provided. The system for optimizing the characteristic diagram determines during the automatic characteristic diagram optimization an adjustment variable value, for example the ignition point, for each characteristic diagram point (characteristic diagram point=a combination of the different input variables), for example the load and speed. However, connections between neighboring characteristic diagram points are not taken into consideration for this.

FIG. 3 shows that when generating a characteristic diagram in this way, jumps occur between the adjustment variable values of neighboring characteristic diagram points, which endanger the transferability of the optimization result to the engine control unit as well as the drivability during a practical vehicle deployment. Large jumps in the adjustment variables of neighboring characteristic diagram points should therefore be avoided. A "smoothed" characteristic diagram must be generated, such as the one shown for a comparison in FIG. 4. A smooth characteristic diagram is characterized by small adjustment variable jumps.

The adjustment variable jump used for evaluating the smoothness of a characteristic diagram is explained with the aid of FIG. 5. For reasons of clarity, an example is shown herein, for which only one adjustment variable is considered, the ignition point ZZP in this case. The ignition point for this example depends only on a single changeable input variable, the speed n in this case, while the value for the moment is held constant. Shown are a speed value $n_a$, called the "actual speed," and two neighboring speed values "n1" and "n2." The actual speed is assigned the ignition point $ZZP_a$ and the two neighboring speeds are assigned the ignition points ZZP1 and ZZP2.

An "ideal smooth ignition point" is determined for the actual speed $n_a$, which leads to a smooth characteristic diagram. In order to determine this "ideal ignition point" for the actual speed, an interpolation between the ignition points of neighboring speeds is carried out, which is shown in FIG. 5 with a dashed straight line between ZZP1 and ZZP2. The difference between this straight line and the ignition point $ZZP_a$ for the actual speed is defined as adjustment variable jump. The smaller the adjustment variable jump (in this case the ignition point jump), the smoother the characteristic diagram at the actual point (here the actual speed), relative to the neighboring points.

For adjustment variables that normally change linearly, the ideal adjustment variable value is determined through a linear interpolation. However, other interpolations can generally be used as well.

The characteristic diagram points normally depend on (at least) two input variables, for example the ignition point for the speed n and the load M. In that case, more than two neighboring characteristic diagram points exist, between which the ideal adjustment variable value must be interpolated, as shown in FIG. 6. The representation according to FIG. 5 is drawn into the coordinate system of FIG. 6. In order to arrive at a smooth characteristic diagram, it is not sufficient to make the interpolation shown in FIG. 5. Rather, the values for the remaining neighboring characteristic diagram points, for example N7 and N3, must additionally be taken into consideration.

The same method is used for other adjustment variables as well, for example the injected fuel amount, the start of the injection, the exhaust-gas return rate etc. In those cases, an interpolation between the neighboring characteristic diagram points is used for each adjustment variable in order to determine the ideal adjustment variable value.

A so-called quality function is used to determine the most favorable adjustment variable combination. It is the goal of the optimization to stay below the predetermined limit values (e.g. for the exhaust gas emissions). The quality function is composed of all variables $G_1$ to $G_n$ that must be optimized (such as consumption, emissions, . . . ) and the associated limit values $GW_1$ to $GW_n$. The weight value of the individual variables in the quality function is determined with the factors $\lambda_1$ to $\lambda_n$. The quality function therefore reads as follows:

$$\text{quality}=\lambda_1(G_i=GW_2)+\lambda_2(G_2-GW_2)+\lambda_2(G_3-GW_3)+ \ldots +\lambda_{3[sic]}(G_n-GW_n)$$

The example given is a quality function for optimizing the fuel consumption be with simultaneous requirement for observing a nitrogen oxide limit value ($NO_x$).

If $NO_x$ designates the actually measured $NO_x$ value and $NO_{x\ max}$ the limit value to be observed and be the actually measured fuel consumption, then the quality function for this application case reads as follows:

$$\text{quality}_{example}=\lambda_1(NO_x-NO_{max\ [sic]})+\lambda_2{}^{*}b_2$$

A minimum is determined for the quality function during the optimization. The sequence of steps for such an optimization in the characteristic diagram optimization system 4 is explained and shown in FIG. 7 in the form of a flow chart. In the aforementioned example, the ZZP is varied until the minimum for the quality function is found. If the limit value for $NO_x$ is still exceeded with this minimum, the quality function can be trimmed by varying the Lagrange factors $\lambda_1$ and $\lambda_2$ to a higher sensitivity relative to the nitrogen oxide value and a new minimum can be searched for.

The variables to be optimized are a function of the adjustment variables and the characteristic diagram point:

$$G_n=f(\text{adjustment variables, input variables})$$

For the above-mentioned example this means:

$$NO_x=f_1(ZZP,\ n,\ M) \text{ and } b_e=f_2(ZZP,\ n,\ M)$$

The quality function minimum for the complete characteristic diagram is determined by determining the minimum of the quality function for each characteristic diagram point through changing the adjustment variables, as shown in FIG. 8. With the exemplary embodiment selected, it is true for a characteristic diagram point that n and M are kept constant and the minimum for the ZZP is determined. The minimum values are determined for each characteristic diagram point. The adjustment variable values belonging to these minimum values are the optimum adjustment variable values with respect to the optimization goals for each characteristic diagram point. The result of these steps is a non-smoothed characteristic diagram according to FIG. 3, which still shows considerable jumps in the adjustment variables.

To avoid adjustment variable jumps, the quality function must then be influenced during the computing operation for optimizing. The development of characteristic diagram jumps during the optimization is avoided in this way. For this purpose, the smoothness of the characteristic diagram to be generated is taken into consideration as additional marginal condition during the optimization.

This is achieved in a first realization of the method according to the invention by "rewarding" an adjustment variable combination leading to a smooth characteristic diagram. Thus, during the optimization this combination is preferred to other adjustment variable combinations, which deliver the same or even better results with respect to the remaining marginal conditions but lead to larger adjustment variable jumps.

The quality function is influenced in this case with a so-called incentive function for rewarding a favorable adjustment variable combination with respect to smoothness. The incentive function can be formulated as follows:

$$\text{Incentive}=|a(VG1-Opt1)|+|b(VG2-Opt2)|+|c(VG3-Opt3)|+\ldots+|d(VGx-Optx)|$$

VG1 to VGx in this case designate the adjustment variables and Opt1 to Optx the optimum values for the corresponding adjustment variables in the neighboring operating stages. The reference letters a to d represent the factors determining the influence of the respective adjustment variable in the incentive function.

The example shown is the incentive function for the ignition point ZZP as adjustment variable, wherein M1 is the optimum for the ignition point from the neighboring operating stages. The optimum is the "ideal adjustment variable value," meaning the interpolated value from the optimum values for the neighboring operating stages:

$$\text{Incentive}_{exp1}=|a(ZZP-M1)|$$

This incentive function is superimposed on the quality function. A new quality function with a different minimum value is obtained, which then leads to a different adjustment value combination:

$$\text{quality}_{incentive}=\text{quality}+\text{incentive}$$

The superimposed function for the example reads as follows:

$$\text{Quality}_{incentive\ exp1}=|\lambda_2(NO_x-NO_{x\ max})+\lambda_2{}^*\ b_e|+|a(ZZP-M1)|$$

The effect of such an incentive function is shown in FIG. 9. The ignition point (adjustment variable) is to be optimized by taking into account a minimum consumption (target variable). The quality function in this case is the course of the consumption above the ignition point. Smooth transitions to neighboring characteristic diagram points are to be generated in the process.

At a characteristic diagram point "a," the ignition point x was determined to be at an optimum with respect to consumption (FIG. 9). An optimization of the ignition point must then be carried out in the neighboring characteristic diagram point 2 by taking into consideration the smoothness. In this characteristic diagram point "b" the ignition point y would be determined as the optimum with respect to consumption, whereas the minimum M2 is less than the minimum M1 (FIG. 9).

The adjustment variable combination at the minimum M1, however, leads to a greater smoothness than the adjustment variable combination at the minimum M2 since the optimum adjustment variable combination for the neighboring characteristic diagram point 1 is at the minimum M1 and not the minimum M2.

In order to influence the smoothness, the incentive function $\text{incentive}_{exp1}$ is therefore added to the quality function $\text{quality}_{exp1}$. The minimum for the incentive function is at the ignition point x of characteristic diagram point "a." The farther the ignition point deviates from the ignition point x, the less favorable the function value becomes (FIG. 9). The addition results in the new quality function $\text{quality}_{incentive,exp1}$ for the characteristic diagram point "b" (FIG. 9). During the optimization in the characteristic diagram point "b," the ignition point is found at the minimum M1, which is closer to the ignition point x of the neighboring characteristic diagram point than the ignition point y. This results in a more favorable adjustment variable combination with respect to the smoothness.

This method is subsequently applied iterative to all characteristic diagram points. During the optimization runs, each characteristic diagram point thus becomes alternately a neighbor, influencing the point that is currently optimized, as well as a point to be optimized, which is influenced by its neighbors. In a general case with several neighbors, an incentive function is used, which accordingly has several minimum values, depending on the optimum adjustment values of the neighbors. The example makes use of a linear incentive function. In dependence on the course of the quality function and other participating variables, however, non-linear incentive functions can also be used to achieve the described influence on the quality function, depending on the requirement.

The iterative course of a characteristic diagram optimization influenced by an incentive function is explained and demonstrated in FIG. 10.

For another realization of the method, the adjustment value jump of a characteristic diagram point is used to determine a measure for the smoothness at this point.

The difference between the ideal value and the value found during the optimization is formed for this in the actual characteristic diagram point. This difference is called an adjustment variable difference. The adjustment variable difference is also included in the optimization in the same way as other marginal conditions, for example the emission values.

In place of the incentive function, the adjustment variable difference is included as additional marginal condition in the optimization. In the process, it is treated in the same way as a measuring value for the piston-type internal combustion engine. For each measurement on the piston-type internal combustion engine, the adjustment variable difference is computed from the adjustment variables of the neighboring operating stages and the actual operating stage. The adjustment variable difference is also included in the quality function, in the same way as the exhaust gas emissions. Thus, one of the values $G_1$ to $G_n$ can contain the smoothness information:

$$\text{Quality}=\lambda_1(G_1-GW_1)+\lambda_2(G_2-GW_2)+\lambda_3(G_3-GW_3)+\ldots+\lambda_{3[sic]}(G_n-GW_n)$$

The following formula is obtained for optimizing the fuel consumption and the nitrogen oxide development, with a specified maximum roughness $R_{max}$ (roughness=the opposite of smoothness):

$$\text{Quality}_{Vdv,exp1}=\lambda_1{}^*b_e+\lambda_2(NO_x-NO_{xmax})+\lambda_3(R-R_{max})$$

if R is the actually determined value for the roughness.

The steps taken for one adjustment variable are described in the following. If several adjustment variables exist, this method is used for each adjustment variable.

An operating stage, called the actual operating stage BS, as well as the adjacent stages are observed in the characteristic diagram. During the optimization of this operating stage, the adjustment variable values for the neighboring stages are constant, since only the adjustment variable value for the actual operating stage is varied. The optimum adjustment variable value for the actual operating stage is computed from the adjustment variable values of the neighboring stages.

A quality function minimum is searched for in the actual operating stage. The adjustment variable of the actual point is varied for this in order to find the minimum, as can be seen in the flow chart in FIG. 11. In the process, another adjustment variable difference is obtained for each adjustment variable value, corresponding to the difference in the smoothness of the adjustment variable curve, relative to the neighboring stages.

At the end of an optimization cycle (optimization of all characteristic diagram points), a global value R is computed for the roughness. "Global" in this case refers to the complete characteristic diagram. For this, all adjustment variable differences are added. This roughness value is compared to the global limit value for the roughness $R_{max}$. A low limit value corresponds to little roughness and thus a high smoothness of the characteristic diagram.

If this limit value is exceeded, the factor $\lambda$ (in the above example $\lambda_3$) for the roughness in the quality function is modified, preferably increased, such that the roughness has a stronger influence on the quality function. The optimum adjustment variables for the changed quality function are determined during the following optimization run. Since this quality function has a stronger dependence on the roughness, more favorable values are achieved for the adjustment variables with respect to smoothness.

By specifying a global limit value, the roughness for the complete characteristic diagram is limited. It does not matter in this case, which share the individual operating stages occupy in the total result, but only that the values fall below the limit value. This operation is repeated until all optimization goals have been reached.

When limiting the roughness with a global limit value, existing local adjustment variable differences can be balanced in the total roughness value with smooth sections of the characteristic diagram. "Local" in this case means in one characteristic diagram point. However, local roughness is undesirable.

To keep these local adjustment variable differences small, the roughness of the characteristic diagram is limited in each individual operating stage by introducing and specifying a local limit value R(n,M). As a result, adjustment variable combinations that exceed this limit value are rejected immediately during the optimization of this characteristic diagram point, as indicated in FIG. 12.

The characteristic diagrams of piston-type internal combustion engines are divided into several areas, in which different marginal conditions and optimization goals apply. An area is predetermined by the legally prescribed driving cycle (for limiting the emissions) and is called a driving cycle range. Other areas are the full-load curve on which the maximum capacity is required and the remainder of the characteristic diagram, in which normally a minimum consumption is desired and which is referred to as minimum consumption area.

The roughness values for the various areas must be combined accordingly to be able to make a statement concerning the roughness in the total characteristic diagram. The following method is used for this:

Upon completion of the optimization, a roughness value is available for each area. The optimization system computes this value for each area with the aid of dwell times from the results of the individual operating stages, in the same way as for consumption and emissions.

Dwell times are predetermined by the driving cycle, but only for the driving cycle area. The number of operating stages and the dwell times in the individual operating stages (for the driving cycle area) are determined by the conversion of the driving cycle to stationary operating stages. Correspondingly specified values do not exist for the full-load curve and the minimum consumption range.

However, dwell times are also required for performing an optimization on the full-load curve and in the minimum consumption range. In principle, optional dwell times can be assumed. However, since the dwell times are also used to extrapolate the roughness, the following method is used for determining the dwell times for full-load curves and the minimum consumption range:

The average dwell time in one operating stage for the driving cycle range can be computed from the dwell time and the number of operating stages in the driving cycle range:

average dwell time=seconds in the driving cycle range/number of operating stages in the driving cycle range This average dwell time is also used for the operating stages on the full-load curve and in the minimum consumption range. It is thus possible to compute the roughness for the complete characteristic diagram. The results from all operating stages are (on the average) extrapolated with the same dwell time. The share of an area relative to the total result thus represents the ratio of the number of operating stages in the range to the total number of operating stages in the characteristic diagram.

With the method shown herein, a smoothed characteristic diagram can be generated, as demonstrated with the comparison between FIG. 3 and FIG. 4. This smoothed characteristic diagram not only permits meeting the emission limit values, as shown with the characteristic diagram in FIG. 3, it also ensures transmission to the engine control unit, as well as the drivability, owing to the smooth transitions between the operating stages. The smoothed characteristic diagrams created during the operation of a reference piston-type internal combustion engine then serve as "mother" characteristic diagrams for producing engine control units for piston-type internal combustion engines of this type.

What is claimed is:

1. A method for automatically generating smoothed characteristic diagrams for electronic engine controls on piston-type internal combustion engines, characterized in that on a reference piston-type internal combustion engine, the adjustment variable combination of the individual, successive operating points is input by means of an engine control and by specifying desired values for the marginal operating conditions of a piston-type internal combustion engine, that the piston-type internal combustion engine is driven at this operating point and the resulting actual values and/or marginal conditions are detected and are compared to the desired values for the marginal conditions in an optimization system that is assigned to the engine control and that in case of deviations, the adjustment variable combinations are changed and optimized step-by-step with the optimization system, wherein a quality function for the respective change in the adjustment variable combination is predetermined in the optimization system, and that the quality function is corrected, respectively by taking into account already fixed values for the adjustment variable combination of at least one neighboring operating point.

2. A method according to claim 1, characterized in that the quality of the respective adjustment variable combination is defined by the function $$\text{Quality}=\lambda_1(G_1-GW_1)+\lambda_2(G_2-GW_2)+\lambda_3(G_3-GW_3)+\ldots+\lambda_n(G_n-GW_n).$$

3. A method according to claim 1, characterized in that by taking into account fixed characteristic diagram values of at least one of the neighboring operating points, an incentive function is superimposed on the quality function:

$$\text{Incentive}=|a(VG\mathbf{1}=Opt\mathbf{1})|+|b(VG\mathbf{2}-Opt\mathbf{2})|+\mathbf{51}\ c(VG\mathbf{3}-Opt\mathbf{3})|+\ldots+|d(VG\text{x}-Optx)|.$$

4. A method according to claim 1, characterized in that a maximum permissible roughness for the characteristic diagram to be generated is specified for the respective adjustment variable and is taken into account for the quality function.

* * * * *